United States Patent Office 2,863,853
Patented Dec. 9, 1958

2,863,853
EPOXY RESIN COMPOSITIONS

Frank Eric Pschorr, Phoenixville, Pa., assignor to Ciba Company Inc., New York, N. Y., a corporation of New York No Drawing. Application April 12, 1957
Serial No. 652,357

3 Claims. (Cl. 260—47)

The present invention relates to novel compositions of matter comprising (a) a liquid ethoxyline resin of the type known as polyglycidyl ether of 4,4'-dihydroxy-diphenyldimethylmethane, (b) methyl-endomethylene-tetrahydrophthalic anhydride and (c) 2,4,6-tri(dimethylaminomethyl)phenol.

More particularly the novel compositions are made up of the following ratio of components: 100 parts of (a) to about 70 to 90 parts of (b) to about 1 to 3 parts of (c). When subjected to heating at elevated temperatures the aforesaid novel compositions of matter are converted into insoluble and infusible solid resins characterized by an extremely high heat distortion temperature. When employing compositions as set forth above and curing them at temperatures up to about 200° C., solid infusible resins are obtained with heat distortions ranging from about 140° C. to about 179° C.

The novel compositions are also characterized by having a long "pot life," that is, they can be stored at room temperature, and after being so stored they can be heat cured to produce the desired high heat distortion, infusible and insoluble resin. Thus the "pot life" of the compositions comprising the invention is from 3 hours to 4 hours in one pound quantities, yet at elevated temperatures they will form infusible solid resins in a short time. Another advantage is that all the components of the composition are liquid so that they can be mixed at room temperature. Accordingly they can be readily mixed together without applying heat to form a homogeneous mixture.

The ethoxyline or 1,2-epoxide resin employed may be any of the liquid epoxy resins known in the art. They are commercial products and readily available on the market. In general they are prepared in the known manner from 4,4'-dihydroxydiphenyl-dimethylmethane (also known as bisphenol A) with an excess of epichlorhydrin in the presence of sodium hydroxide. We prefer to use such a liquid polyglycidyl ether of 4,4'-dihydroxydiphenyl-dimethylmethane which has a viscosity of about 10,000 to 17,000 cps. at 23° C., and an epoxy value (mols per kilogram) of about 5.0 to 5.4.

The methyl-endomethylene-tetrahydrophthalic anhydride is a compound having the formula:

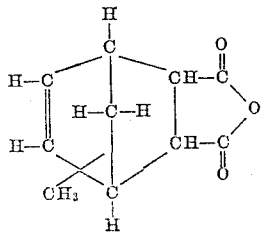

It is a light yellow semi-viscous liquid with a viscosity of about 138.4 cps. at 25° C. It is available commercially under the name Methyl Nadic Anhydride.

The method by which the components of the novel composition are combined is as follows: The ethoxyline resin is added to the 2,4,6-tri(dimethyl-aminomethyl) phenol with stirring and after a homogeneous mixture has been obtained the methyl-endomethylene-tetrahydrophthalic anhydride is added and stirring is continued until well mixed. The sequence is of importance to avoid premature and undesirable reactions of the 2,4,6-tri(dimethylaminomethyl) phenol and the methyl-endomethylene-tetrahydrophthalic anhydride. The resulting composition is then subjected to heating at an elevated temperature with the maximum curing temperature not exceeding 200° C., the preferred maximum being about 180° C. The curing is preferably carried out in stages, as for example for two hours at about 100° C., two hours at about 150° C., and then one hour at about 180° C.

The following examples will serve to illustrate the invention:

Example 1

100 grams of a liquid epoxide resin polyglycidyl ether of 4,4'-dihydroxydiphenyldimethylmethane having an epoxide value of about 5 to about 5.4 and a viscosity of about 10,000 to 17,000 cps. at 23° C. were added to 2 grams of 2,4,6-tri(dimethylaminomethyl) phenol with stirring. After a homogeneous mixture has been obtained, there were added 79.6 grams of methyl-endomethylene-tetrahydrophthalic anhydride and the stirring continued until all the components were well mixed. The resulting composition was heated as follows: two hours at 100° C., two hours at 150° C., and one hour at 180° C. There was obtained an infusible and insoluble resin having a heat distortion temperature of 152° C. (ASTM D648–264 p. s. i.). With curing at two hours at 150° C. and two hours at 200° C., the heat distortion temperature was 154° C.

Example 2

Instead of employing 2 grams of 2,4,6-tri(dimethylaminomethyl) phenol, as in Example 1, there was used only 1.5 grams. Otherwise the conditions were the same as in Example 1. Curing the composition according to the first mentioned procedure resulted in an infusible and insoluble resin having a heat distortion of 141° C., whereas under the second mentioned procedure the heat distortion temperature was 145° C.

Example 3

In this example, instead of employing 2 grams of 2,4,6-tri(dimethylaminomethyl) phenol there was used 3 grams. Otherwise the conditions were the same as Example 1. Curing the composition according to the first mentioned procedure in Example 1 gave an insoluble and infusible resin having a heat distortion of 154° C., whereas under the second mentioned procedure the heat distortion temperature was 145° C. When 2.5 grams of tri(dimethylaminomethyl) phenol was employed instead of 3 grams, the heat distortion temperatures were 153° C. and 150° C., respectively.

Example 4

100 grams of a liquid epoxide resin (polyglycidyl ether of 4,4'-dihydroxydiphenyldimethylmethane having an epoxide value of about 5 to about 5.4) were added to 2 grams of 2,4,6-tri(dimethylaminomethyl) phenol with stirring. After a homogeneous mixture has been obtained, there were added 79.6 grams of methyl-endomethylene-tetrahydrophthalic anhydride and the stirring continued until all the components were well mixed. The resulting composition was heated as follows: three hours at 150° C. and four hours at 260° C. There was obtained an infusible and insoluble resin having a heat distortion temperature of 171° C. (ASTM D648–264 p. s. i.). With curing at two hours at 100° C. and 192 hours at 200° C., the heat distortion temperature was 179° C.

It will be understood that any other liquid polyglycidyl ether of 4,4'-dihydroxydiphenyldimethylmethane having a different viscosity and epoxy value can be employed. These can be prepared in the known manner by varying the ratio of the epichlorhydrin to the bisphenol A employed.

The novel compositions of the present invention have a variety of uses. They may be employed as surface coatings, casting resins adhesives, and as laminating resins. Molded products can be prepared therefrom by adding the usual fillers and other modifying agents, such as pigments, dyes and lubricants, and curing as indicated above in the appropriate molds.

What is claimed is:

1. A composition of matter comprising (a) a liquid polyglycidyl ether of 4,4'-dihydroxydiphenyldimethylmethane, (b) methyl-endomethylene-tetrahydrophthalic anhydride, and (c) 2,4,6-tri(dimethylaminomethyl)phenol, wherein the ratio of components (a), (b) and (c) is about 100:70–90:1–3 parts by weight, said composition when subjected to heat at an elevated temperature forming an insoluble and infusible resin having a high heat distortion temperature.

2. A composition of matter obtained by heating the composition of claim 1 to an elevated temperature so as to form an insoluble and infusible resin having a high heat distortion temperature.

3. A process which comprises adding (a) liquid polyglycidyl ether of 4,4'-dihydroxydiphenyldimethylmethane to (b) 2,4,6-tri(dimethylaminomethyl)phenol and stirring till the mixture is homogeneous, then adding with stirring (c) methyl-endomethylene-tetrahydrophthalic anhydride, and then heating the resulting composition to form an insoluble and infusible resin, the ratio of the aforesaid components (a), (b) and (c) being about 100:70–90:1–3 parts by weight.

References Cited in the file of this patent

UNITED STATES PATENTS

| 2,741,607 | Bradley et al. | Apr. 10, 1956 |
| 2,744,845 | Rudoff | May 8, 1956 |

FOREIGN PATENTS

| 133,819 | Australia | Aug. 10, 1949 |